(12) United States Patent
Ori

(10) Patent No.: US 6,359,719 B1
(45) Date of Patent: Mar. 19, 2002

(54) OPTICAL MODULATOR AND PROJECTOR

(75) Inventor: Yuichiro Ori, Moriyama (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/362,372

(22) Filed: Jul. 28, 1999

(30) Foreign Application Priority Data

Jul. 29, 1998 (JP) .......................................... 10-213695

(51) Int. Cl.[7] .............................. G02F 1/03; G02B 5/32
(52) U.S. Cl. .......................... 359/242; 359/15; 349/57; 349/61
(58) Field of Search .......................... 359/242, 15, 237, 359/238, 240; 349/5, 57, 61, 113

(56) References Cited

U.S. PATENT DOCUMENTS

| | | | |
|---|---|---|---|
| 4,726,662 A | * 2/1988 | Cromack | ..................... 349/57 |
| 5,475,513 A | * 12/1995 | Nakanishi et al. | ............. 349/5 |
| 5,506,701 A | * 4/1996 | Ichikawa et al. | ............. 359/15 |
| 5,608,552 A | 3/1997 | Smith | ............................. 349/5 |
| 5,737,113 A | 4/1998 | Kuramochi et al. | ........ 359/259 |
| 5,894,359 A | * 4/1999 | Suzuki et al. | ................. 359/15 |

* cited by examiner

*Primary Examiner*—Huy Mai
(74) *Attorney, Agent, or Firm*—Morrison & Foerster LLP

(57) ABSTRACT

An optical modulator has a spectral means for diffracting white illumination light into light of predetermined wavelength bands, a liquid crystal layer for modulating the intensity of the light entering a plurality of two-dimensional pixels, a condensing means for condensing the light spectrally diffracted by the spectral means so as to direct the light to each pixel of the liquid crystal layer, and a reflecting means for reflecting the light that passes through the liquid crystal layer in approximately the same direction as the entering light.

19 Claims, 7 Drawing Sheets

OPTICAL MODULATOR AND PROJECTOR

This application is based on Japanese Application No. 10-213695, the content of which is hereby incorporated by reference.

FIELD OF THE INVENTION

The invention relates to a reflection-type liquid crystal optical modulation element and a projection display device for projecting a color image on a screen using the reflection-type liquid crystal optical modulation element.

BACKGROUND OF THE INVENTION

Liquid crystal optical modulation elements which may be used as optical modulators, include a transmission-type and reflection-type, both of which are subject to demand for panel compactness and increased number of display pixels. In the case of identical size panels, the aperture ratio can generally be reduced as the number of pixels increases; but since the pixel drive wiring and the like can be provided on the back side of reflective electrodes in liquid crystal optical modulators of the reflection-type elements, the aperture ration can be increased as the number of pixels is increased. Thus, compactness can be achieved at the same aperture ratio and the same number of pixels. As a result, the reflection-type liquid crystal optical modulators are advantageous for high definition television (HDTV) formats such as digital television, and high quality displays can be attained if the reflective type optical modulators are used.

Devices which display a color image using liquid crystal optical modulators are either a three-panel type using three liquid crystal optical modulators corresponding to red (R), green (G), and blue (B) ("RGB"), respectively, or a single-panel type using a single liquid crystal optical modulator. The single-panel type devices can be made more compact and are extremely advantageous from a cost perspective since they use fewer components. However, in order to use a color absorption filter having an RGB pattern for colorization in a liquid crystal optical modulator, approximately two-thirds of the light is wasted. For this reason, a liquid crystal optical modulator has been processed which used a diffraction element (e.g., hologram) as a color filter to eliminate the aforesaid disadvantage.

FIG. 13 shows an example of a conventional transmission type liquid crystal optical modulator using a color filter comprising a diffraction element. White illumination light L1 is condensed by an array of micro lenses, and diffracted into a spectrum in the RGB wavelength bands by a unidimensional diffraction element D0. The respective diffracted light fluxes pass through the pixels corresponding to a liquid crystal layer 2, and are used to display a color image. In this way, the majority of the liquid crystal optical modulator using a diffraction element as a color filter is the transmission type. This results in the disadvantages described below when a color filter comprising a diffraction element is used in a reflective type liquid crystal optical modulator.

As an example, in a display device which projects a color image using reflective type liquid crystal optical modulators, unlike transmissive type liquid crystal optical modulators, the illumination light and projections are typically separated between the liquid crystal surface and the projection surface via a polarizing prism or the like. In the case of a three-panel liquid crystal optical modulation element, since the illumination light enters the liquid crystal optical modulator after color separation, the principal ray of the light flux entering the respective elements passes through the condensing micro lenses, enters the pixel of the liquid crystal layer perpendicularly, and subsequently subjected to regular reflection by the reflective electrode and returns to the same micro lens.

Conversely, when a single-panel liquid crystal optical modulator uses a diffraction element as a color filter, the principal rays of at least two of the light fluxes among the RGB light fluxes diffracted into spectral light via the diffraction/dispersion action of the diffraction element enter at a predetermined angle relative to the reflective electrode surface. For example, when illumination light L1 passes through condensing micro lenses 1 and spectral diffraction element D0, illumination light L1 passes through first substrate P1 and liquid crystal layer 2, and among the light fluxes which condense and impinge reflective electrode 3 and second substrate P2, the principal rays of the R and G light flux impinge reflective surface of reflective electrode 3 at predetermined angles. In this way, part of the R and G light components are subject to regular reflection by the reflective surface as by a normal mirror, and is reflected in the direction of the other pixels. Since this light is used as stray light LS together with projection light L2 to display a color image, cross-talk is generated for each picture element, thus greatly reducing the display quality of the projection image.

In U.S. Pat. Nos. 5,737,113 and 5,608,552, liquid crystal optical modulators are proposed to eliminate these disadvantages. This construction, however, generates new disadvantages which must be resolved. For example, in the former liquid crystal optical modulator, a complex construction is necessary to drive the image signals of the liquid crystal via a method which differs from conventional methods. In the latter liquid crystal optical modulator, a complex hologram having a 4-layer structure is required due to the necessity of having the illumination light enter at an inclination. Furthermore, the hologram must be thickened to achieve adequate separation of the P and S polarized light components, thereby increasing the dependency of the diffraction efficiency of the hologram on the wavelength and the angle.

SUMMARY OF THE INVENTION

The invention provides an improved liquid crystal optical modulation element and projection display device. The invention further provides a reflective-type liquid crystal optical modulation element capable of displaying color at high display quality via a simple construction without using an absorption type color filter. In addition, the invention provides an inexpensive single-panel projection display device capable of displaying a bright and high quality color.

A liquid crystal optical modulation element in accordance with an embodiment of the invention includes spectral means for diffracting white illumination light into light of predetermined wavelength bands, a liquid crystal layer for modulating the intensity of the light entering a plurality of two-dimensional pixels, condensing means for condensing the light spectrally diffracted by the spectral means so as to direct the light to each pixel of the liquid crystal layer, and reflecting means for reflecting the light which pass through the liquid crystal layer in approximately the same direction as the entering light.

BRIEF DESCRIPTION OF THE DRAWINGS

These and other objects and features of the invention will become clear from the following description, taken in conjunction with the preferred embodiments with reference to the accompanying drawings in which.

DETAILED DESCRIPTION OF THE INVENTION

The embodiments of the liquid crystal, optical modulation element and projection display device of the invention are described hereinafter with reference to the accompanying drawings. Like parts are designated by like reference numbers throughout the several drawings to eliminate duplicative descriptions.

Figure 1:
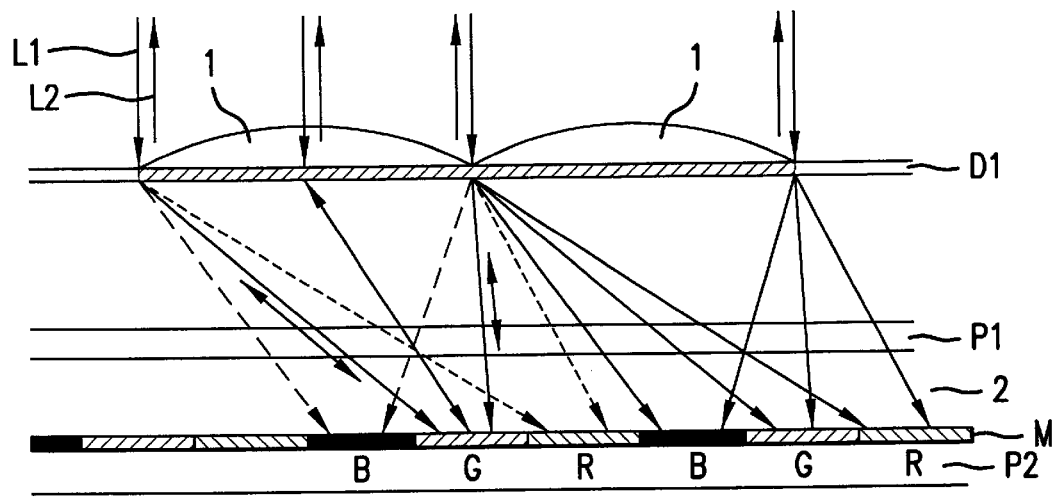
FIG. 1 shows the optical structure of a first embodiment.

FIG. 1 shows a cross sectional view of a construction of the first embodiment. The embodiment shown in FIG. 1 is a liquid crystal optical modulator of the reflective type, provided with a micro lens 1, a diffraction element or lens D1, a first substrate P1, a reflective electrode M and a second substrate P2. A transparent electrode (not shown in the drawing) is provided before hand on the bottom surface of first substrate P1, and a liquid crystal layer 2 is positioned medially to the transparent electrode and reflective electrode M. Liquid crystal layer 2 is a modulation means for modulating the intensity of the light entering a plurality of two-dimensional pixels.

Diffraction element D1 is a spectral means for diffracting white illumination light L1 into predetermined wavelength bands, and is provided with a unidimensional diffraction grating structure. Diffraction element D1 is a lens which achieves spectral diffraction centering on the RGB wavelength bands with identical degrees of diffraction (normally, order+1), and is a thin diffraction lens which has a high diffraction efficiency in a wide wavelength range. A surface-relief type diffraction element shown in FIG. 1, a binary element type diffraction element, or a thin hologram diffraction element or the like can be used as diffraction element D1. Microlenses 1 comprise a cylindrical lens array functioning as a condensing means for condensing the light diffracted by diffraction element D1 so as to direct the light to each pixel of the liquid crystal layer. The light of the RGB wavelength bands is directed to the pixel corresponding to liquid crystal layer 2 by combining the condensing action of micro lens 1 functioning as a refractive element and the spectral diffraction action of diffractive element D1.

Reflective electrode M is a reflection means for reflecting the light that has passed through liquid crystal layer 2, and functions to reflect the entering light in approximately the same direction as the entering light. In the case of a normal mirror, the optical paths f, entering light and reflected light differ greatly via normal reflection. Since the light passing through liquid crystal layer 2 is reflected in approximately the same direction (i.e., the same direction insofar as crosstalk is not generated) as the entering light relative to reflective electrode M, the optical path of the entering light and reflected light relative to reflective electrode M is identical. An example of a construction realizing this function of reflective electrode M is described below.

Figure 5:
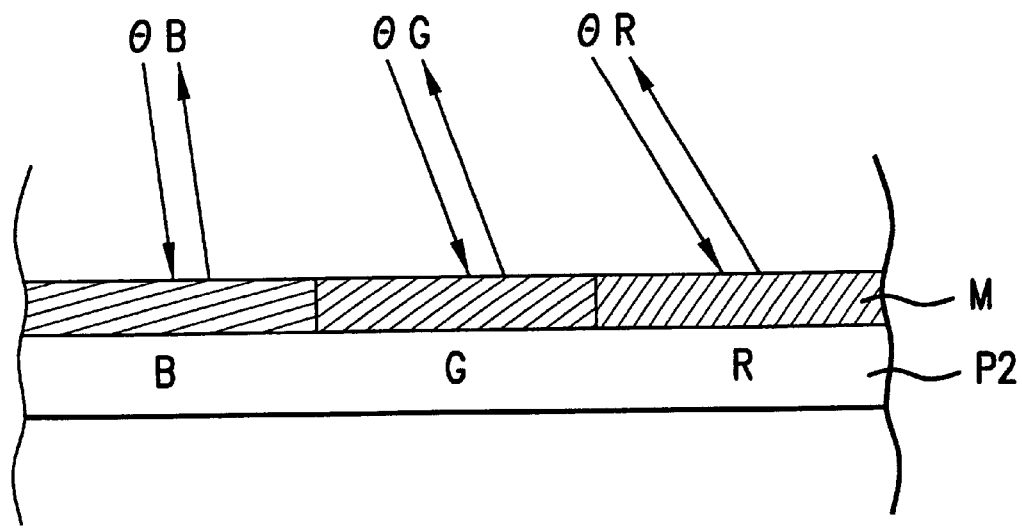
FIG. 5 is a cross-sectional view of the reflective electrode comprising the reflective surface in a reflective-type volume hologram.

FIG. 5 shows a reflective electrode M comprising a reflective surface by a reflective type volume hologram. This reflective electrode M comprises an integrated construction of a reflective type volume hologram, and a transparent electrode (not shown in the drawing) provided on a surface of liquid crystal layer 2. The transparent electrode may comprise an ITO layer or the like, and the reflective volume hologram may have a hologram array structure so as to increase the diffraction efficiency of the reflected light relative to the RGB wavelength bands.

Figure 6:
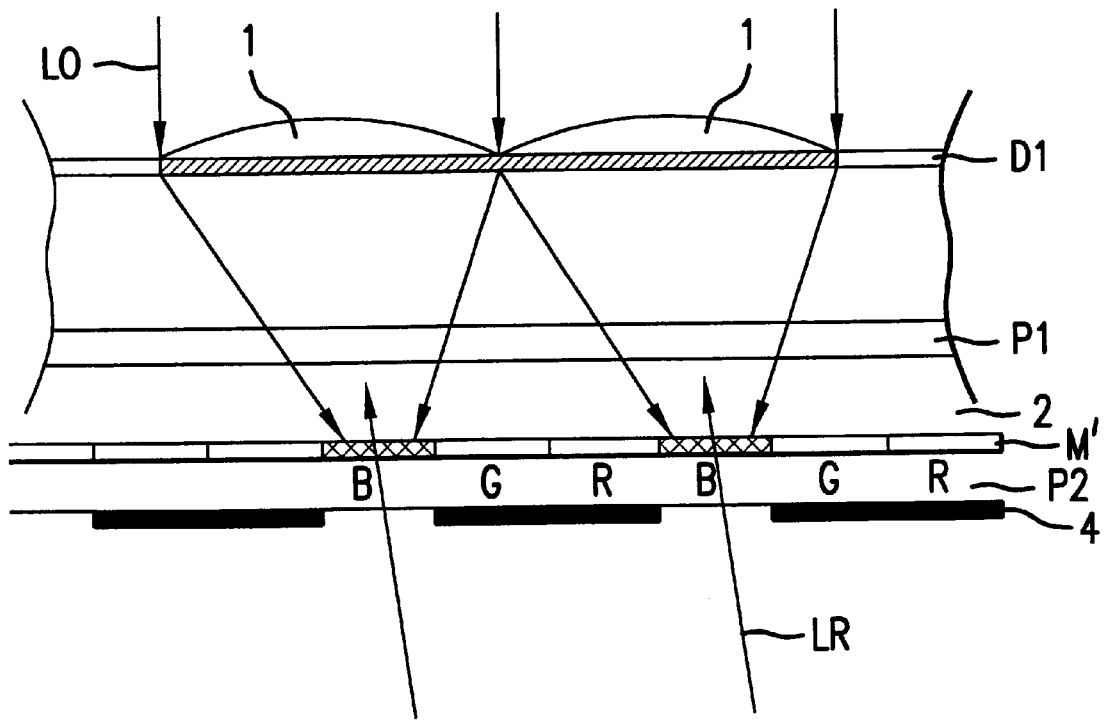
FIG. 6 illustrates the method of manufacturing the reflective electrode comprising the reflective-type volume hologram.

The preparation of the reflective type volume hologram is accomplished by illuminating both sides of a thick hologram substrate via a reference light and an object light at an angle, producing a hologram having a predetermined diffraction structure via the interference of the two lights. The hologram array element used in the embodiment is produced by three optical exposures of a photosensitive material M' by the RGB wavelength components, as shown in FIG. 6. During the B component exposure, the G and R pixel areas are blocked by a mask 4. Then, the B laser light LO enters micro lens 1 as the object light, and a reference light LR exposure occurs from a second substrate P2 through mask 4. In this way, the interference fringes corresponding to the B pixels are recorded on photosensitive material M', producing a hologram array structure corresponding to the B pixels. The G and R hologram array structures are created in a fashion similar to that of the B pixels. As a result, a single hologram may be created with three exposures, or the three holograms exposed by each wavelength component can be overlaid to construct the reflective type volume hologram.

Figure 7:
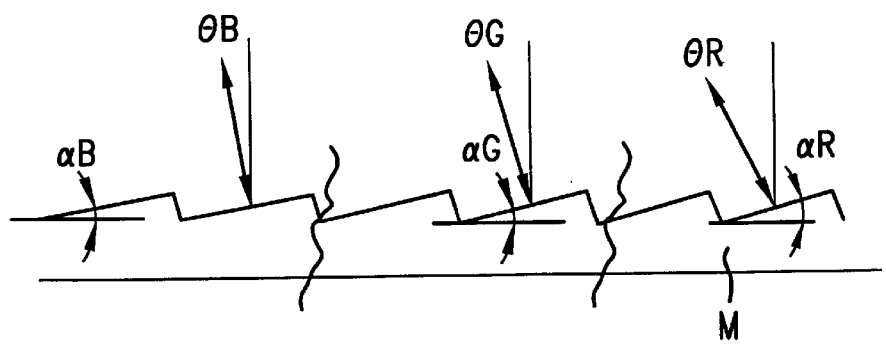
FIG. 7 is a cross-sectional view showing the reflective electrode comprising the reflective surface of a blazed diffraction surface.

FIG. 7 shows a reflective electrode M having a reflective surface comprising a blazed diffraction surface. The reflective electrode M is a blazed reflective diffraction grating, and may be constructed by providing a metal electrode layer (not shown in the drawings) coating on the surface of glass or resin substrate having a surface relief type diffraction grating, or may be constructed as a surface relief type diffraction grating on a metal sheet having an electrode pattern. The reflective surface of the reflective electrode M is a blazed mirror surface having different incident angles θB, θG, θR, for each area corresponding to the RGB wavelength components, respectively, so as to have the same blazed angle α (αB, αG, αR) as the principal ray incident angle θ (θB, θG, θR). The reflected light returns in approximately the same direction as the incident rays by satisfying $2\sin\theta = \lambda/\Lambda$ (where λ represents the center wavelength in each wavelength band, and Λ represents the grating pitch).

Figure 8:
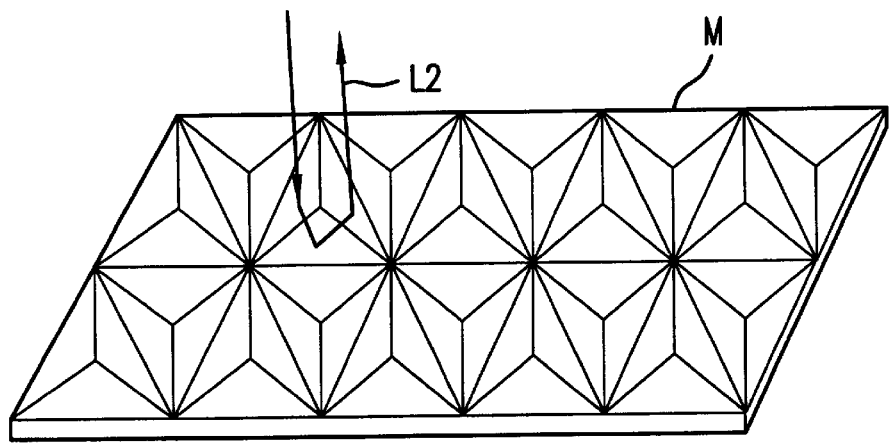
FIG. 8 is a perspective view of a reflective electrode comprising the reflective surface in a sheet-like retro-reflector.
Figure 9:
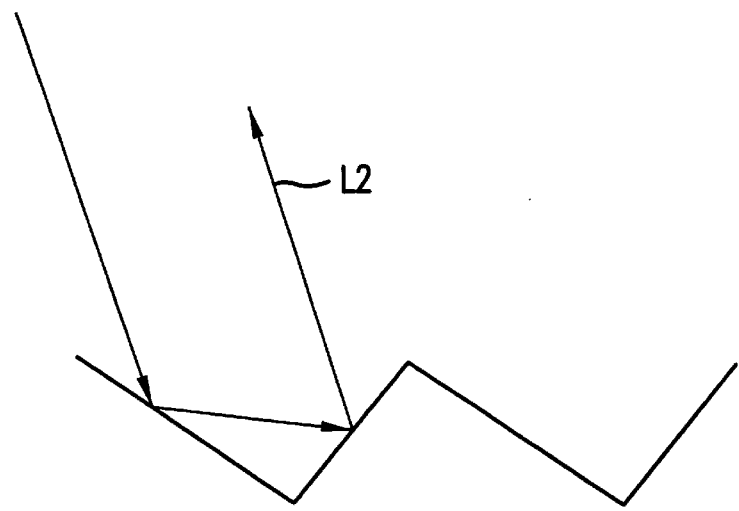
FIG. 9 is a cross-sectional view showing an enlargement of the sheet-like retro-reflector.
Figure 10:
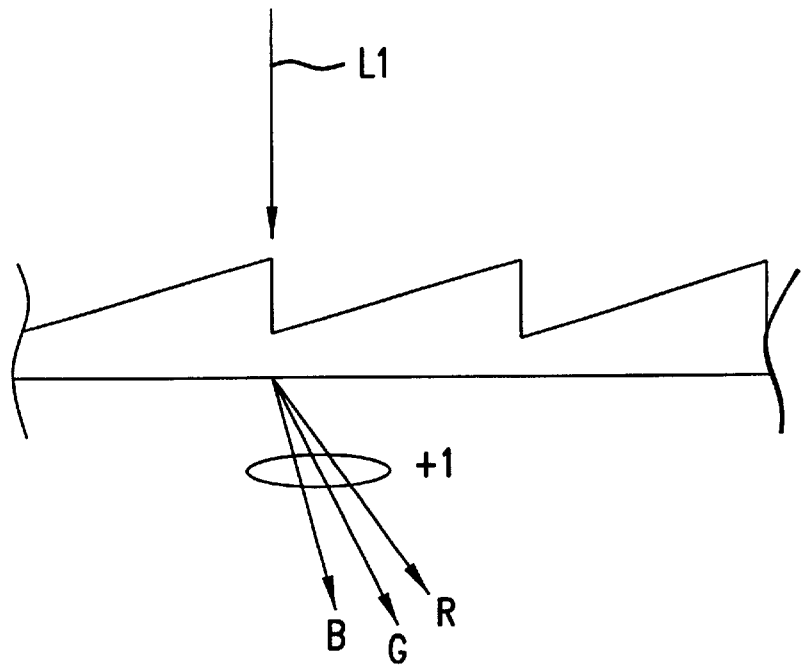
FIG. 10 is a cross-sectional view of a diffraction element useable in the first and second embodiments.

FIGS. 8 and 9 show a reflective electrode M constructed as a reflective surface comprising a retro-reflector using a retro-reflective type element. This retro-reflector is sheet-like with a two-dimensional corner-cube structure. Since the incident ray is reflected three times by the corner-cube structure to reflect the light back in the same direction as the entrance direction, the light of each wavelength component is returned within micro lenses 1 corresponding to the same picture element regardless of the different incident angles. The reflective electrode M may be constructed by providing a metal electrode layer (not shown in the drawings) coating on the surface of a retro-reflector formed of glass or resin or the like. or may be constructed as a retro-reflector formed of a metal sheet having an electrode pattern.

As shown in FIG. 1, when the parallel rays of white illumination light L1 pass through micro lens 1 and diffraction element D1, the rays are spectrally diffracted in to the RGB wavelength bands via the diffraction action of diffraction element D1, and directed to the pixels corresponding to liquid crystal layer 2 via the condensing action of micro lens 1. Since the RGB light components are diffracted at predetermined angles, when one micro lens 1 corresponds to one picture element, three pixels of liquid crystal layer 2 corresponding to micro lens 1 are shifted parallel relative to micro lens 1. Accordingly, the principal rays of the light of all wavelength components are condensed at an inclination relative to the reflective surface of reflective electrode M. The light passing through liquid crystal layer 2 is reflected by reflecting electrode M. As previously mentioned, reflective electrode M functions to reflect the incident light in approximately the same direction as the entering light, such that the RGB light components reflected by reflective electrode M at predetermined angles are reflected in approximately the same direction as the incident light. The reflected light of each wavelength band is again diffracted by diffraction element D1 and subjected to wavelength recombination, and emitted through micro lens 1.

Figure 14:
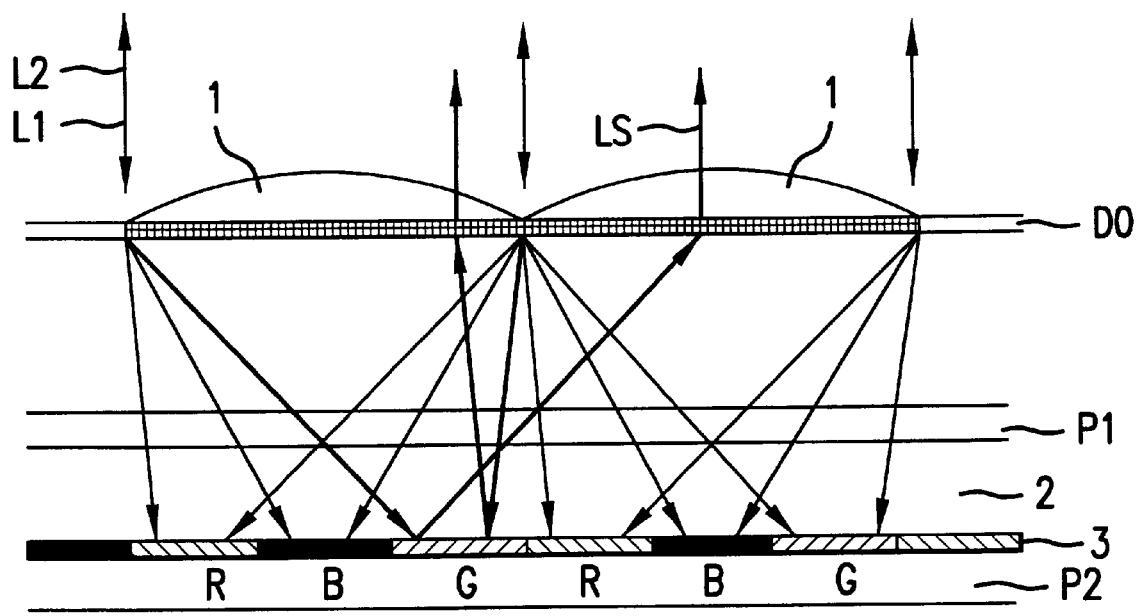
FIG. 14 is a cross-sectional view of a conventional liquid crystal optical modulator of the reflection-type using a diffraction element as a color filter.

As described previously, the display light from the RGB pixels comprising one picture element can be returned to the micro lens 1 side by the aforesaid specific function provided by reflective electrode M. Therefore, the generation of cross-talk is prevented for each picture element since stray light LS is not generated, as shown in FIG. 14. In this way, a color display can be realized which has both a simple construction and provides a high display quality. A single panel color display which makes highly efficient use of light can be realized using diffraction element D1 as a color filter without using an absorption type color filter and reflective type liquid crystal optical modulator.

Figure 2:
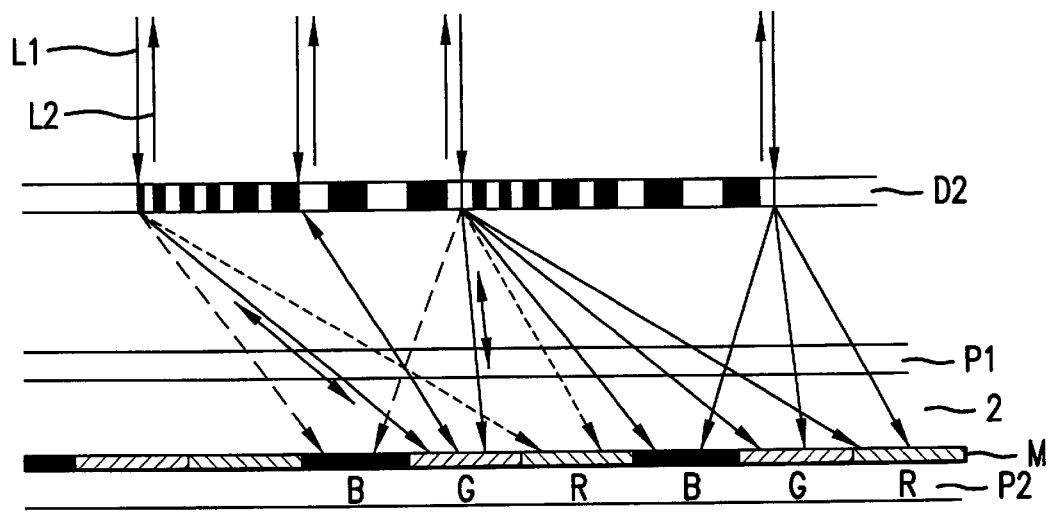
FIG. 2 shows the optical structure of a second embodiment.

FIG. 2 shows a cross-sectional view of a structure of a second embodiment. The second embodiment is characterized by a diffraction element D2, but otherwise has the same construction as the first embodiment. That is, the two embodiments are the same with the exception that diffraction element D2 is used alternatively to micro lens 1 and diffraction element D1. Although diffraction element D1 has the function of dividing the spectral light and micro lens 1 has the function of condensing the light in the first embodiment, diffraction element D2 is constructed to both divide the spectral light and condense the light in the second embodiment. Accordingly, the RGB wavelength components form an optical path identical to that of the first embodiment between diffraction element D2 and reflective electrode M. Diffraction element D2 has a chirped unidimensional diffraction grating structure, and diffracts and condenses the RGB light components at predetermined angles by varying the pitch period.

Figure 3:
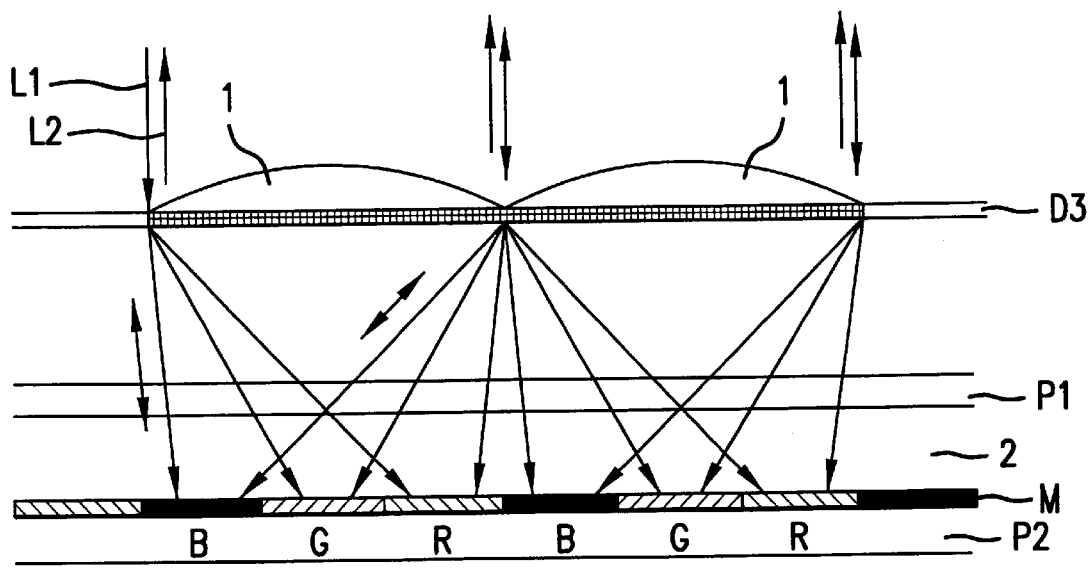
FIG. 3 shows the optical structure of a third embodiment.

FIG. 3 shows the third embodiment of the invention. The third embodiment is characterized by a diffraction element D3; the first and third embodiments are identical with the exception that diffraction element D3 is used in place of diffraction element D1. Although diffraction element D1 is of a type which diffracts the center wavelength of each wavelength band RGB via the same degree of diffraction, diffraction element D3 is of a type which diffracts the center wavelength of each wavelength band RGB by different degrees of diffraction. The light of wavelength bands B and R are diffracted at a predetermined angle, and the light of wavelength band G is not diffracted and passes through diffraction element D3. In this way, the three pixels of liquid crystal layer 2 corresponding to one picture element have a positional relationship which does not shift relative to micro lens array 1.

Figure 11:
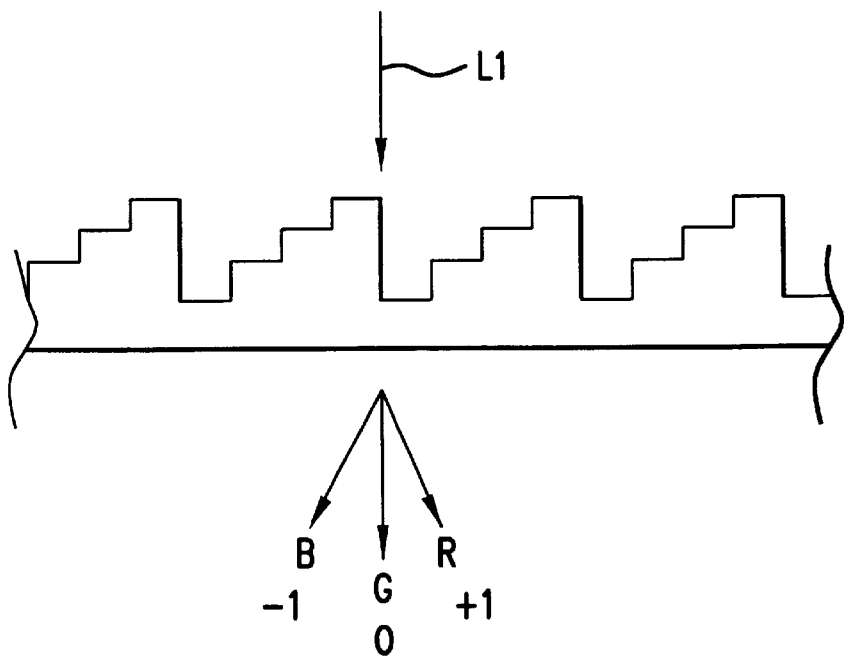
FIG. 11 is a cross-sectional view of a diffraction element useable in the third and fourth embodiments.

A surface relief type binary diffraction element such as that shown in FIG. 11 may be used as diffraction element D3. Diffraction element D3 having this type of step-like structure can be readily formed using semiconductor fabrication art. The height difference h of each step is expressed by the equation $h=\lambda G/(n-1)$ (where $\lambda G$ represents the center wavelength (~540 mm), and n represents the refractive index of the medium of diffraction element D3). The center wavelength of each diffracted wavelength band increases the diffraction efficiency at different diffraction degrees. The G wavelength component is not diffracted since $2\pi$ phase modulation is performed at each step.

In the third embodiment, since the G wavelength component enters diffraction element D3 and is condensed from a perpendicular direction relative to the reflective surface of reflective electrode M, a function to reflect the entering rays in approximately the same direction as the incident light is unnecessary for the area corresponding to the G component on reflective electrode M. The G wavelength component is not reflected in a direction corresponding to other picture elements even when subject to regular reflection, and therefore does not reduce image quality. Thus, there is no need to provide the reflective function relative to the G wavelength component, which allows the reflective electrode M to be readily manufactured.

Figure 4:
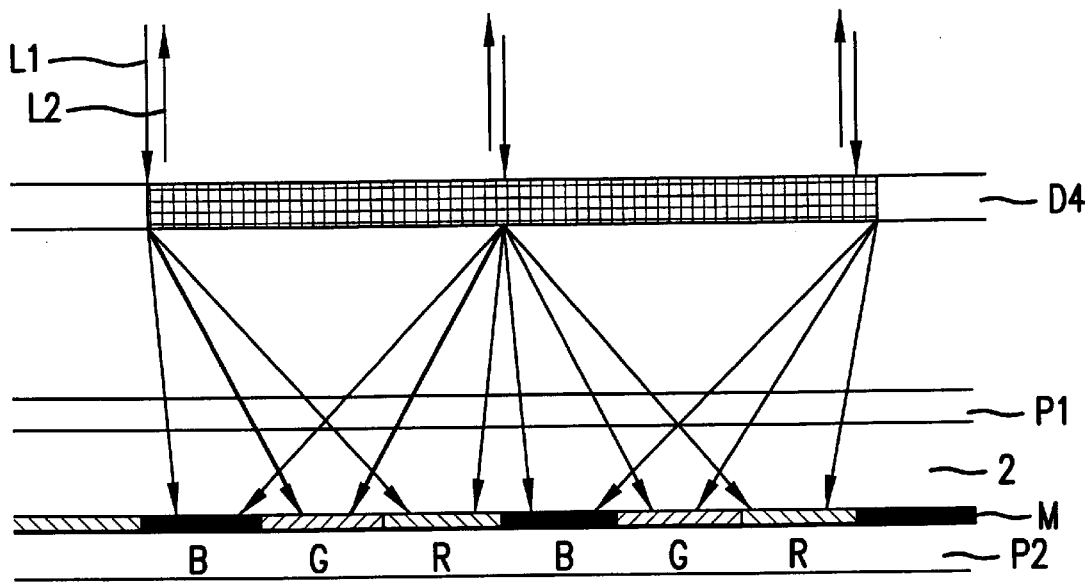
FIG. 4 shows the optical structure of a fourth embodiment.

FIG. 4 shows the cross-sectional structure of a fourth embodiment of the invention. The fourth embodiment is characterized by a diffraction element D4, which is identical to the third embodiment with the exception that diffraction element D4 is used instead of diffraction element D3 and micro lens 1. In the third embodiment, diffraction element D3 has the function of dividing the spectral light and micro lens 1 has the function of condensing the light; with the fourth embodiment, diffraction element D4 is constructed to both divide the spectral light and condense the light. Accordingly, the RGB wavelength components form an optical path identical to that of the third embodiment between diffraction element D4 and reflective electrode M. Diffraction element D4 may have a diffraction grating structure for dividing light and a diffraction grating structure for condensing light on both sides. The light can be spectrally divided by the diffraction element shown in FIG. 11, but the light cannot be condensed due to the absence of optical power. A diffraction lens having a condensing optical power may be used in combination with the diffraction element shown in FIG. 11. The RGB wavelength components are respectively condensed at predetermined angles, the R and B wavelength components are respectively diffracted at predetermined angles, and the G wavelength component passes through diffraction element D4 without being diffracted for spectral diffraction via the use of diffraction element D4 provided with the dual function of spectral diffraction and light condensation. The diffraction lens may have, for example, a chirped unidimensional diffraction grating structure so as to condense the RGB light components at respectively predetermined angles.

Figure 12:
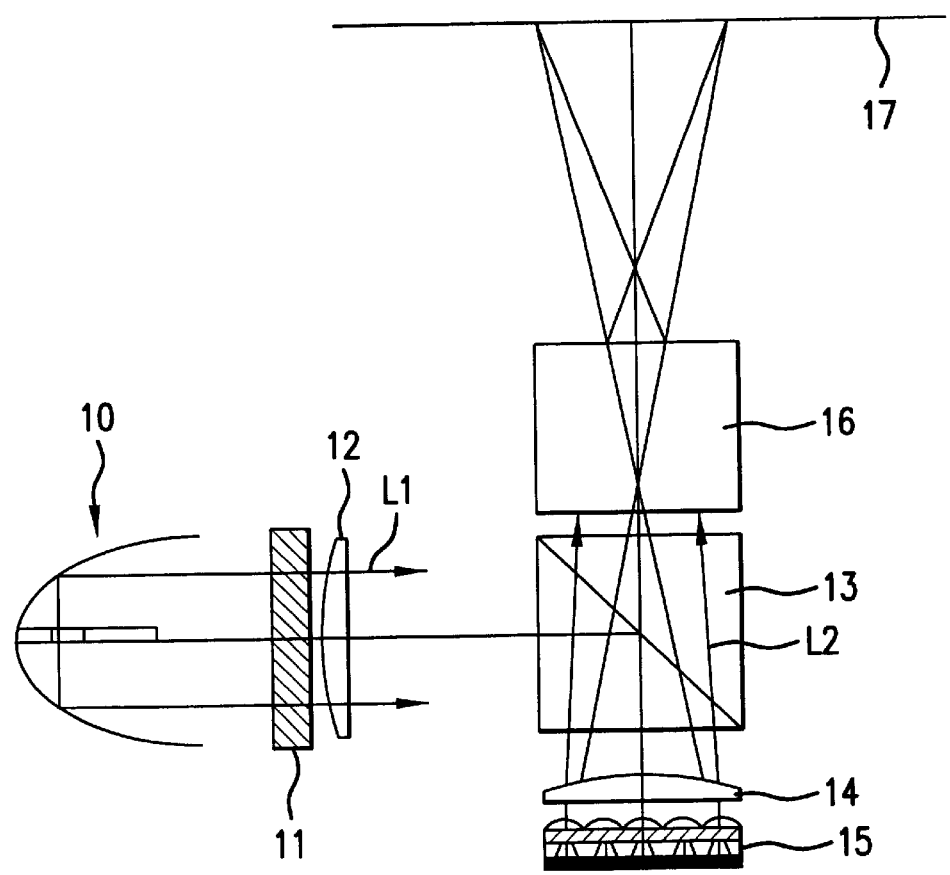
FIG. 12 shows the optical structure of a fifth embodiment.
Figure 13:
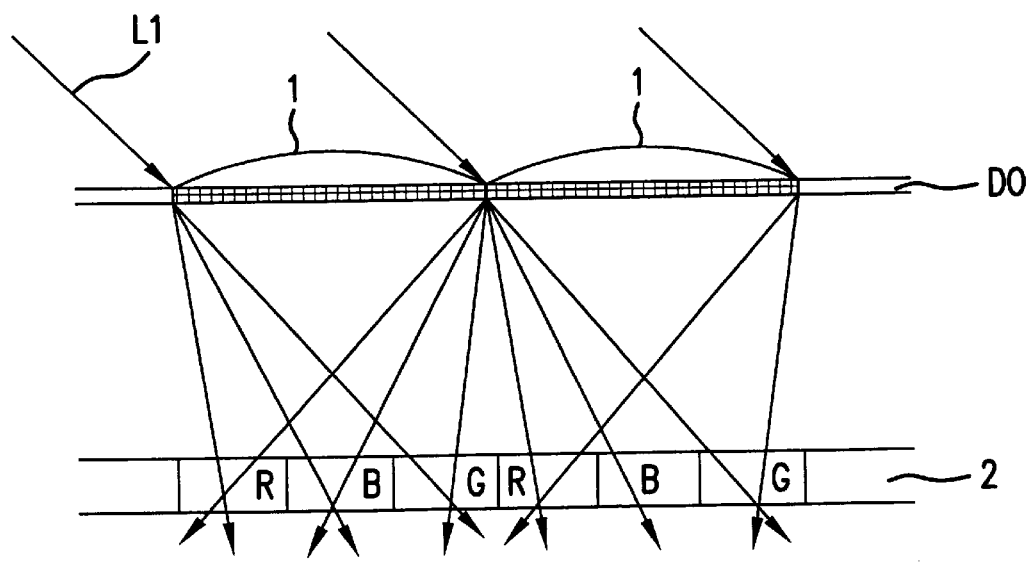
FIG. 13 is a cross-sectional view of a conventional liquid crystal optical modulator of the transmission-type using a diffraction element as a color filter.

FIG. 12 schematically shows the optical structure of a fifth embodiment. The fifth embodiment is a projection display device for projecting and displaying a color image on a screen 17 using one of the liquid crystal optical modulators of the previously described first through fourth embodiments. This projection display device comprises a white light source 10, a polarization conversion element 11, a condenser lens 12, a polarization beam splitter 13, a condenser lens 14, a reflection type liquid crystal optical modulator 15 and a projection optical unit 16. White illumination light L1, which has been separated into a uniform polarized light component S by polarization conversion element 11, enters polarization beam splitter 13, and this white illumination light L1 is reflected by polarization beam splitter 13 and enters liquid crystal optical modulator 15. Light L1 is partially converted to a polarized light component P by previously mentioned liquid crystal layer 2 and is emitted from liquid crystal optical modulator 15. Polarized light component P, which has passed directly through polarization beam splitter 13, enters projection optical unit 16 as projection light L2, and forms a color image on screen 17. In this way, a bright, high quality color display is accomplished via an inexpensive single-panel type construction.

According to the aforesaid liquid crystal optical modulation element of the invention, the characteristics function of the reflection means prevents the generation of stray light, thereby preventing the generation of cross-talk of each picture element via a simple construction. Accordingly, a color display of high display quality is realized inexpensively. Furthermore, bright image projection is possible via the excellent efficiency of light usage because the color display is accomplished without using an absorption-type color filter. The projection display device using this liquid crystal optical modulation element produces a bright, high density and high quality color display using an inexpensive single-panel construction. Although the invention has been fully described by way of examples with reference to the accompanying drawings, it is to be noted that various changes and modification will be apparent to those skilled in the art. Therefore, unless such changes and modifications otherwise depart from the scope of the invention, they should be construed as being included therein.

What is claimed is:
1. An optical modulator comprising:
   two-dimensional pixels;
   spectral means for diffracting white illumination light into bands of light of predetermined wavelength;
   a liquid crystal layer for modulating the intensity of the bands of light passing therethrough;
   condensing means for condensing the bands of light spectrally diffracted by the spectral means so as to direct the bands of light to corresponding two-dimensional pixels of the optical modulator; and
   reflecting means for each two-dimensional pixel for reflecting the light coming to the two-dimensional pixels through the liquid crystal layer in an incidence direction that is approximately the same as the reflection direction of the light reflected from the reflecting means, said reflecting means defining the two-dimensional pixel of the optical modulator.

2. An optical modulator claimed in claim 1, wherein the spectral means comprises a diffraction element.

3. An optical modulator claimed in claim 1, wherein the condensing means comprises a refraction element.

4. An optical modulator claimed in claim 1, wherein the condensing means comprises a diffraction element.

5. An optical modulator claimed in claim 1, wherein the spectral means comprises a chirped unidimensional diffraction grating structure.

6. An optical modulator claimed in claim 5, wherein the spectral means diffracts and condenses RGB light components at predetermined angles by varying a pitch period.

7. An optical modulator comprising:
   spectral means for diffracting white illumination light into bands of light of predetermined wavelength;
   a liquid crystal layer for modulating the intensity of the bands of light entering a plurality of two-dimensional pixels;
   condensing means for condensing the bands of light spectrally diffracted by the spectral means so as to direct the bands of light to each corresponding two-dimensional pixel of the liquid crystal layer; and
   reflecting means for each two-dimensional pixel for reflecting the light that passes through the liquid crystal layer in approximately the same direction as the light entering the liquid crystal layer;
   wherein the reflecting means comprises a hologram array, a blazed reflective diffraction grating or a retro-reflection type element.

8. An optical modulator claimed in claim 7, wherein the reflecting means further comprises a transparent electrode provided on a surface of the liquid crystal layer.

9. A projector comprising:
   an illumination optical system for emitting white illumination light;
   a liquid crystal optical modulation element for modulating the white illumination light to image light; and
   a projection optical system for projecting the image light on a screen;
   wherein the liquid crystal optical modulation element comprises:
      two-dimensional pixels;
      spectral means for diffracting the white illumination light into bands of light of predetermined wavelength;
      a liquid crystal layer for modulating the intensity of the bands of light passing therethrough;
      condensing means for condensing the bands of light spectrally diffracted by the spectral means so as to direct the bands of light to corresponding two-dimensional pixels of the optical modulation element; and
      reflecting means for each two-dimensional pixel for reflecting the light coming to the two-dimensional pixels through the liquid crystal layer in an incidence direction that is approximately the same as the reflection direction of the light reflected from the reflecting means, said reflecting means defining the two-dimensional pixel of the optical modulation element.

10. A projector claimed in claim 9, wherein the spectral means comprises a diffraction element.

11. A projector claimed in claim 9, wherein the condensing means comprises a refraction element.

12. A projector claimed in claim 9, wherein the condensing means comprises diffraction element.

13. A projector claimed in claim 9, wherein the projection optical system comprises:

a white light source;

a polarization conversion element;

a condenser lens;

a polarization beam splitter; and a projection optical unit.

14. A projector comprising:

an illumination optical system for emitting white illumination light;

a liquid crystal optical modulation element for modulating the white illumination light to image light; and a projection optical system for projecting the image light on a screen;

wherein the liquid crystal optical modulation element comprises spectral means for diffracting the white illumination light into bands of light of predetermined wavelength, a liquid crystal layer for modulating the intensity of the bands of light entering a plurality of two-dimensional pixels, condensing means for condensing the bands of light spectrally diffracted by the spectral means so as to direct the bands of light to each corresponding two-dimensional pixel of the liquid crystal layer and reflecting means for each two-dimensional pixel for reflecting the light that passes through the liquid crystal layer in approximately the same direction as the light entering the liquid crystal layer; and wherein the reflecting means comprises a hologram array, a blazed reflective diffraction grating or a retro-reflection type element.

15. A method for projecting a color image on a screen from a projection display device using a reflection-type liquid crystal optical modulation element having two-dimensional pixels defined by reflecting electrodes, comprising the steps of:

diffracting white illumination light into bands of light of predetermined wavelength;

modulating the intensity of the light coming to and being reflected by the reflecting electrode by means of a liquid crystal layer;

condensing the bands of light spectrally diffracted by the diffracting step so as to direct the bands of light to corresponding two-dimensional pixels; and reflecting the light coming to the two-dimensional pixels thorough the liquid crystal layer in an incidence direction that is approximately the same as the reflection direction of the light reflected from the reflecting electrode.

16. A method claimed in claim 15, wherein the diffracting step is performed by a diffraction element.

17. A method claimed in claim 15, wherein the condensing step is performed by a refraction element.

18. A method claimed in claim 15, wherein the condensing step is performed by a diffraction element.

19. A method for projecting a color image on a screen from a projection display device using a reflection-type liquid crystal optical modulation element, comprising the steps of:

diffracting white illumination light into bands of light of predetermined wavelength;

modulating the intensity of the light entering a plurality of two-dimensional pixels by means of a liquid crystal layer;

condensing the bands of light spectrally diffracted by the diffracting step so as to direct the bands of light to each corresponding two-dimensional pixel of the liquid crystal layer; and reflecting the light that passes through the liquid crystal layer in approximately the same direction as the light entering the liquid crystal layer;

wherein the reflecting means comprises a hologram array, a blazed reflective diffraction grating or a retro-reflection type element.

* * * * *